United States Patent
Jordan et al.

(10) Patent No.: US 8,191,927 B2
(45) Date of Patent: Jun. 5, 2012

(54) LIQUID COOLED INFLATOR

(75) Inventors: Michael P. Jordan, South Weber, UT (US); Scott A. Jackson, Centerville, UT (US); Matthew A. Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 98 days.

(21) Appl. No.: 12/858,022

(22) Filed: Aug. 17, 2010

(65) Prior Publication Data

US 2012/0043744 A1    Feb. 23, 2012

(51) Int. Cl.
*B60R 21/26* (2011.01)
(52) U.S. Cl. .................... 280/741; 280/736
(58) Field of Classification Search ............. 280/741, 280/737, 736, 742; 102/530, 531, 704
See application file for complete search history.

(56) References Cited

U.S. PATENT DOCUMENTS

| | | | |
|---|---|---|---|
| 3,305,319 A * | 2/1967 | Perkins et al. | 422/643 |
| 6,039,347 A | 3/2000 | Maynard | |
| 6,076,468 A * | 6/2000 | DiGiacomo et al. | 102/530 |
| 7,059,633 B2 | 6/2006 | Wang et al. | |
| 7,770,924 B2 * | 8/2010 | Cox et al. | 280/741 |
| 7,887,091 B1 * | 2/2011 | Cox et al. | 280/741 |
| 2002/0158454 A1 | 10/2002 | Huber et al. | |
| 2003/0137132 A1 * | 7/2003 | Last et al. | 280/736 |
| 2010/0013201 A1 | 1/2010 | Cox et al. | |
| 2011/0221174 A1 * | 9/2011 | Cox et al. | 280/741 |

OTHER PUBLICATIONS

Co-Pending U.S. Appl. No. 12/723,275, "Additives for Liquid-Cooled Inflators," filed Mar. 12, 2010.
Co-Pending U.S. Appl. No. 12/723,331, "Multi-Stage Inflator," filed Mar. 12, 2010.

* cited by examiner

*Primary Examiner* — Drew Brown
(74) *Attorney, Agent, or Firm* — Sally J. Brown; Paully Petersen & Erickson

(57) ABSTRACT

An inflator including a housing with a first chamber that contains a quantity of gas generant. An initiator is operatively associated with the first chamber and in reaction initiating communication with at least a portion of the quantity of gas generant. The initiator, upon actuation, acts to ignite at least a portion of the quantity of gas generant to form gas. The housing further has a second chamber adjacently disposed to the first chamber. The second chamber contains a sealed storage reservoir and a piston assembly. The sealed storage reservoir includes a liner and a lid and contains a quantity of liquid. The piston assembly includes a piston. During deployment, the piston moves to unseal the storage reservoir to release at least a portion of the quantity of liquid such that the released liquid contacts and cools gas formed by the ignition of the gas generant. A discharge opening permits gas to exit the housing.

20 Claims, 1 Drawing Sheet

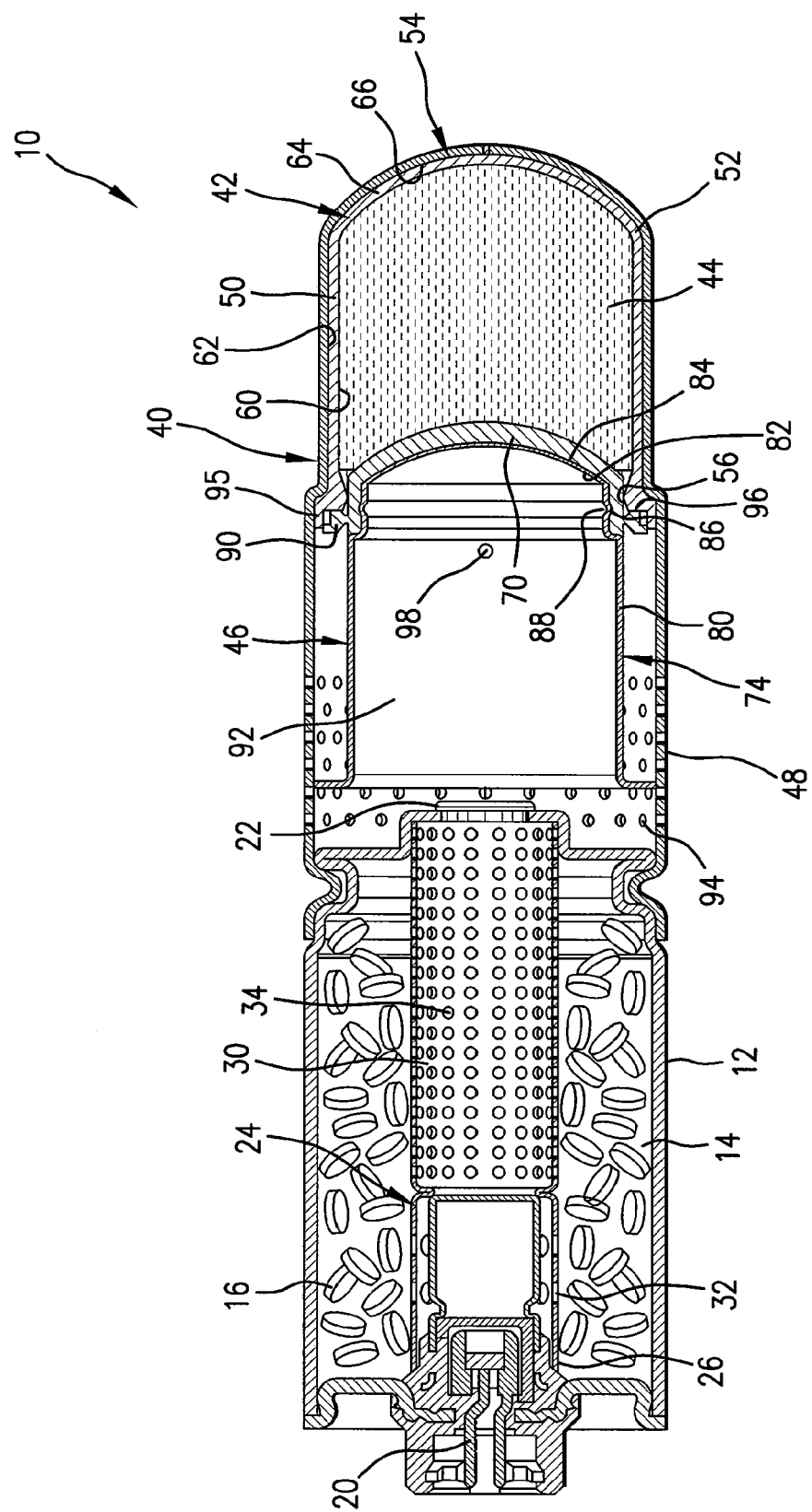

LIQUID COOLED INFLATOR

BACKGROUND OF THE INVENTION

The subject matter of this application is related to prior U.S. patent application Ser. No. 12/218,664, filed on 17 Jul. 2008, and prior U.S. patent application Ser. Nos. 12/723,275 and 12/723,331, each respectively filed on 12 Mar. 2010. The disclosures of each of these related patent applications are hereby incorporated by reference herein and made a part hereof, including but not limited to those portions which specifically appear hereinafter.

This invention relates generally to inflators for use in inflating inflatable restraint airbag cushions, such as used to provide impact protection to occupants of motor vehicles. More particularly, the invention relates to liquid-cooled inflators and the inclusion and use of sealed cooling liquid reservoirs therein.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Pyrotechnic inflators also commonly include a gas treatment element such as in the form of a filter. The inclusion of a filter form of gas treatment element may be desired to assist in the removal of solids, such as in the form of residual matter of the pyrotechnic gas generating material, such as may otherwise be entrained in the gas stream. Such a filter may also desirably serve to cool the gas formed by the combustion of a pyrotechnic gas generating material prior to the discharge of such gas from the inflator device. Filter elements, however, are often expensive and the inclusion thereof can add significantly to the cost and weight of an associated inflator device and inflatable restraint installation.

The automotive industry continues to demand inflatable restraint systems that are smaller, lighter, and less expensive to manufacture. As vehicles become smaller and more compact, corresponding changes to associated inflatable restraint systems are desired and required in order to meet the constraints of these smaller vehicles.

An airbag inflator is a significant component of an inflatable restraint system. Accordingly, reducing the size, weight, and/or cost of an inflator can result in significant size, weight, and/or cost savings in the overall inflatable restraint system.

Thus, there is a need and demand for pyrotechnic-containing inflator devices and associated methods of operation such as to reduce or eliminate the need for the inclusion of filter elements. Further, there is a need and demand for such inflator devices and associated methods of operation that provide or result in improved or enhanced performance, such as in either or both increased gas output and gas output of reduced temperature.

At least in part in response to such needs and demands, inflators such as described in the above-referenced related applications have been developed. The demands for inflatable restraint systems that are smaller, lighter, and less expensive to manufacture, however, pose ongoing challenges to suppliers to provide novel and inventive solutions.

SUMMARY OF THE INVENTION

The present invention provides improved inflator devices and associated or corresponding methods of cooling gas formed in an inflator.

In accordance with one aspect, there is provided an inflator that includes a housing that at least in part defines a first chamber that contains a quantity of gas generant. An initiator is operatively associated with the first chamber. The initiator is in reaction initiating communication with at least a portion of the quantity of gas generant. The initiator, upon actuation, serves to ignite at least a portion of the quantity of gas generant to form gas. The housing further at least in part defines a second chamber adjacently disposed to the first chamber. The second chamber contains a sealed storage reservoir and a piston assembly. The sealed storage reservoir comprises a liner including a cup-shaped base having a closed first end and an oppositely disposed open second end. The cup-shaped base includes a side wall covering an interior side wall surface of the second chamber and an end wall covering an end wall surface of the second chamber. The storage reservoir also includes a lid to seal close the second end of the base. The sealed storage reservoir contains a quantity of liquid. The piston assembly includes a piston. During deployment, the piston moves to unseal the storage reservoir to release at least a portion of the quantity of liquid such that the released liquid contacts and cools gas formed by the ignition of the gas generant. The housing further has at least one discharge opening to permit gas to exit the housing.

In accordance with another embodiment there is provided an inflator that includes a housing at least in part defining a first chamber. The first chamber has a constant volume and contains a quantity of gas generant solid. An initiator is operatively associated with the first chamber in reaction initiating communication with at least a portion of the quantity of gas generant solid. Upon actuation, the initiator acts to ignite the gas generant solid to form gas. The housing additionally at least in part defines a second chamber. The second chamber is adjacently disposed to the first chamber. The second chamber contains a sealed storage reservoir and a piston assembly. The sealed storage reservoir includes a liner having a cup-shaped base with a closed first end and an oppositely disposed open second end. The cup-shaped base includes a side wall covering an interior side wall surface of the second chamber. The cup-shaped base also includes an end wall covering an end wall surface of the second chamber. The storage reservoir also includes a lid to seal close the second end of the base. The sealed storage reservoir contains a quantity of liquid. The liquid includes at least one of a fuel soluble in the liquid or an oxidizer soluble in the liquid. The piston assembly includes a piston. During deployment, the piston moves to unseal the storage reservoir to release at least a portion of the quantity of liquid such that the released liquid contacts and cools gas formed by the ignition of the gas generant. The housing further includes at least one discharge opening to permit gas to exit the housing.

In another aspect, there is provided a method of cooling gas formed in an inflator. The inflator includes a housing at least in part defining a first chamber containing a quantity of gas generant, an initiator, and at least in part defining a second chamber adjacently disposed to the first chamber. The second chamber contains a sealed storage reservoir and a piston assembly. The sealed storage reservoir includes a liner including a cup-shaped base having a closed first end and an oppositely disposed open second end. The cup-shaped base includes a side wall covering an interior side wall surface of the second chamber and an end wall covering an end wall surface of the second chamber. The storage reservoir also includes a lid to connect to the base to seal close the second end of the base. The sealed storage reservoir contains a quantity of liquid. The piston assembly includes a piston. In accordance with one such method of cooling gas formed in an inflator, the gas generant is ignited to form gas and result in the piston moving to unseal the storage reservoir to expel at least a portion of the quantity of liquid from the second chamber. The expelled liquid in turn contacts and cools gas formed by the ignition of the gas generant.

As used herein, references to a "liquid" are to be understood as encompassing fluid material such as may suitably flow under conditions of operation.

As used herein, references to a specific composition, component, material or the like as "fuel-rich" or as a "fuel" are to be understood to refer to such composition, component, material or the like which generally lacks sufficient oxygen to burn completely to $CO_2$, $H_2O$ and $N_2$.

Correspondingly, references herein to a specific composition, component, material or the like as "fuel-deficient" or as an "oxidizer" are to be understood to refer to such composition, component, material or the like which generally has more than sufficient oxygen to burn completely to $CO_2$, $H_2O$ and $N_2$.

Other objects and advantages will be apparent to those skilled in the art from the following detailed description taken in conjunction with the appended claims and drawing.

BRIEF DESCRIPTION OF THE DRAWING

The FIGURE is a simplified sectional view of an embodiment of an inflator, in accordance with one embodiment of the invention.

DETAILED DESCRIPTION OF THE INVENTION

As described in greater detail below, the present invention provides an improved inflator device and associated or corresponding methods of cooling gas formed in an inflator.

The FIGURE illustrates an inflator device in accordance with a one embodiment of the invention and generally designated by the reference numeral 10. The inflator 10 includes a housing 12 such as forms a chamber 14 that, at least in part contains a quantity of gas generant 16. Thus, the chamber 14 is sometimes referred to as a "gas generant chamber."

The inflator 10 also includes an initiator 20. The initiator 20 is used to ignite the gas generant 16. When the gas generant 16 is ignited, a quantity of inflation gas is formed. This gas may then be channeled into an associated inflatable restraint device (not shown) such as in the form of an airbag and such as to deploy the airbag. Those skilled in the art will appreciate that initiators and gas generants are known in the art and that a variety of different features may be used for these components.

The chamber 14 is sealed by a burst disk 22. The chamber 14 has a constant volume. Before, during, and after deployment of the inflator, the volume of the gas generant chamber 14 remains the same.

A gas flow element or baffle 24 is positioned in the chamber 14. The baffle 24 includes an initiator housing portion 26 adapted to contain, accept or otherwise house the initiator 20 and a diffuser portion 30, described in greater detail below.

The initiator housing portion 26 of the baffle 24 includes a hole or preferably a plurality of holes 32. The diffuser portion 30 of the baffle 24 also includes a hole or preferably a plurality of holes 34.

When activated, the initiator 20 produces ignition products such as including hot gas that flow out through the holes 32 and into the gas generant chamber 14. These ignition products contact and ignite the gas generant 16. In turn, the ignition of the gas generant 16 creates a supply of gas such as passes through the holes 34 in the diffuser portion 30 of the baffle 24 to the interior thereof and then contacts the burst disk 22. The increase in pressure within the chamber 14 caused by ignition of the gas generant 16 will rupture the burst disk 22 and allow the combustion product gas to exit the chamber 14.

The housing 12 further defines a second chamber 40 generally adjacently disposed to the first chamber 14. The second chamber 40 contains a sealed storage reservoir 42, such as to store or otherwise effectively contain a quantity of liquid 44 as described in greater detail below, a piston assembly 46, and a diffuser section 48.

The sealed storage reservoir 42 includes a liner 50 including a cup-shaped base 52 having a closed first end 54 and an oppositely disposed open second end 56. The cup-shaped base 52 includes a side wall 60 covering an interior side wall surface 62 of the second chamber 40. The cup-shaped base 52 also includes an end wall 64 covering an end wall surface 66 of the second chamber 40. The storage reservoir 42 also includes a lid 70 to seal close the second end 56 of the liner base 52.

The lid 70 and/or the liner 50 can desirably be made or formed of a plastic material, preferably a low vapor transmission rate plastic. Suitable such plastic materials for use in selected embodiments include polycarbonate, polycarbonate blends, polyphenylene sulfide (PPS), polyethylene terephthalate (PET), polybutylene terephthalate (PBT), and polypropylene (PP).

Those skilled in the art and guided by the teachings herein provide will appreciate that a liner such as described above and such as made of plastic may, if desired, be fabricated, formed or otherwise shaped to form or include additional features therein. For example, in accordance with one embodiment, such a liner may include a feature such as shaped like an O-ring such as located in the area where the cup-shaped liner is thick such as to function as a dynamic seal upon operation of the inflator. If desired, such or other features can simply be included or incorporated into a liner, such as via a two shot molding, where such a liner has been mold fabricated, for example.

Those skilled in the art and guided by the teachings herein provided will appreciate that the joining together of such lids and liners in appropriate sealing fashion can be accomplished by various techniques. For example and in accordance with the invention, lids and liners can be suitably joined in sealing fashion such as by welding the cup-shaped base with the lid via laser transmission welding, ultrasonic welding, or solvent welding to seal close the second end of the base. In some embodiments it may be desirable to adhesively bonded the cup-shaped base with the lid to seal close the second end of the base.

In practice, laser transmission welding has been found to be a particularly effective technique for use where the lid and liner are fabricated of polypropylene, for example.

The piston assembly 46 includes a piston 74. The piston 74 can desirably be made or formed of metal such as carbon steel, high-strength low alloy steel or stainless steel, for example. The piston 74 is shown as including a cylindrical side wall 80 and a head end wall 82. The head end wall 82 at least in part defines a front face 84 of the piston 74. The piston 74 also includes a circumferential beaded ring 86 near or adjacent the piston front face 84. For example, such a beaded ring can be simply formed of a ring of the piston metal extending out beyond adjacent portions of the piston metal.

In the illustrated embodiment, the lid 70 can desirably be captured onto the metal piston 74 by being insert molded over the beaded ring 86. In addition, the beaded ring 86 can desirably also form an internal cavity 88 such as in the form of a ring on the inside surface of the piston 74. The presence of such an internal cavity can act or serve to trap or remove slag products such as may form upon the combustion of certain gas generant materials without the added weight and cost of the inclusion of a filter or like element. It is to be understood that, additional or alternative internal features can be incorporated or included in a piston, if desired, to assist or facilitate the capture or removal of gas generant slag products.

The lid 70 includes a circumferentially disposed attachment ring 90 such as can desirably be joined to the side wall 60 of the liner base 52 in sealing fashion such as in the above-described manner and such as to form a shear joint designed to appropriately facture upon deployment.

The interior of the piston 74 is or forms a mixing chamber 92.

During deployment, gas produced by the combustion of the gas generant material 16 exits the gas generant chamber 14 and impacts the piston 74 such as by filling the mixing chamber 92. This gas contacts and acts on the piston 74 such as to fracture the shear joint between the lid 70 and the liner 50 such that the piston begins to move/displace towards the chamber 40. As the piston 74 advances into the chamber 40, the gas produced can exit the inflator via discharge openings 94 such as formed in the diffuser section 48.

The piston 74 movement/displacement towards the chamber 40, serves to separate the attachment ring 90 from the lid 70 and to permit the piston 74 to be received within the storage reservoir 42. The open end 56 of the liner 50 includes a shoulder 95 such as having or forming a pocket 96 to restrain the attachment ring 90 upon separation of the attachment ring 90 from the lid 70 during deployment.

Once one or more of the piston openings 98 have been moved/displaced into the chamber 40, at least a portion of the quantity of liquid 44 will begin to flow out of the storage reservoir 42 through the piston openings 98.

The movement of the piston 74 acts or serves to hydraulically expel the liquid 44 in the chamber 40 thereby causing the liquid 44 to inject through the piston openings 98 for contact and mixing with the gas generant combustion product gas. The liquid 44 injected into the interior of the piston 74 can vaporize and be used to inflate the airbag. Moreover, the vaporization desirably operates to cool the gas generant combustion product gas. Those skilled in the art and guided by the teachings herein provided will appreciate that as the gas generant combustion product gas push against the piston head, particulates and other undesirable byproducts can be deposited onto the piston head and are thus desirably separated from the quantity of gas generant combustion product gas.

The liquid 44 can desirably be any liquid that remains a liquid between $-35°$ C. and $85°$ C. The liquid must also be capable of vaporizing endothermically and, when vaporized, produce a gas that is within acceptable effluent limits associated with airbags. Also, the liquid desirably is non-corrosive to facilitate storage in a simple chamber. Any liquid that will meet these criteria may be used as the liquid 44. An example of a liquid that meets such criteria includes water such as mixed with an appropriate salt additive such as $CaCl_2$, for example.

In one particular aspect of the invention, it has been found advantageous that the liquid 44 include as an additive at least one of a fuel soluble in the liquid or an oxidizer soluble in the liquid. When the liquid 44 is injected through the piston openings 94 and mixed with the gas produced by the combustion of the gas generant material, the at least one of a fuel and an oxidizer desirably decomposes, combusts and/or otherwise reacts to form additional gaseous products.

For example, in the case of an inflator 10 containing a fuel-rich gas generant, it can be advantageous to include a soluble oxidizer in the liquid such that such oxidizer is available for reaction with residual fuel material such as to result in more complete reaction of available reactant and increased gas production. Correspondingly, in the event of an inflator containing a fuel-deficient gas generant, it can be advantageous to include a soluble fuel in the liquid such that such fuel is available for reaction with residual oxidizer material such as to result in more complete reaction of available reactant and increased gas production.

As will be appreciated by those skilled in the art and guided by the teachings herein provided, various soluble fuels and soluble oxidizers can be used in the practice of the invention. For example and dependent on the specifics of a particular application, suitable soluble fuels and soluble oxidizers such as for inclusion when the liquid comprises water include fuel materials such as urea, guanidine nitrate, alcohols including glycols such as propylene glycol and diethylene glycol, for example, glycerin, other sugars, glycine, chromates and dichromates such as sodium chromate, for example, and carbonates such as magnesium carbonate, for example, formamide, oxalic acid, and ammonium oxalate, for example as well as oxidizer materials such as ammonium nitrate, methylammonium nitrate, and ammonium perchlorate, for example.

Moreover, it is to be understood that suitable additive materials can in various embodiments serve multiple, additional or different functions. For example, in some embodiments, a suitable fuel can be or also desirably serve as a thickening agent or gelling agent. Examples of fuel materials that can serve as thickening or gelling agents include gums such as guar gum, xanthan gum or the like and celluloses such as hydroxypropyl cellulose (HPC), for example. Further, the inclusion of additives such as alcohols and sugars can desirably serve as freeze point depressants or anti-freeze materials.

Similarly, carbonates and chromates, including dichromates, can also desirably serve as corrosion inhibitors or anti-corrosion materials, for example.

A liquid preferred for use in accordance with one embodiment of the invention is desirably composed of a mixture that suitably comprises, consist essentially of or consists of water, $CaCl_2$ and propylene glycol (1,2-propanediol). Those skilled in the art and guided by the teachings herein provided will appreciate that such mixtures can contain components such as $CaCl_2$ and propylene glycol in various relative amounts dependent on the particular requirements of a specific application. For example, while the inclusion of $CaCl_2$ can significantly reduce the freezing point of the mixture, the $CaCl_2$ will typically not react, e.g., is inert, and thus adds to the inflator residue and increases the burden for filtering the inflation gas. Also, while propylene glycol can serve as a fuel and thus through its inclusion serve to increase the gas output from the inflator without detrimentally adding to the inflator residue, various undesirable products of combustion may form if propylene glycol is included in the mixture in too high a relative amount. In view of the above, mixture of water with 10-20% $CaCl_2$ and 3-10% propylene glycol is desirable in some preferred embodiments, with a mixture of water with 15% $CaCl_2$ and 5% propylene glycol being particularly preferred for some embodiments.

Those skilled in the art and guided by the teachings herein or sided with further appreciate, that in accordance with selected embodiments suitable liquids may include additional or alternative inert materials to $CaCl_2$. For example, a suitable liquid may include laponite, such as may serve as a thickener for the liquid.

In one preferred embodiment, the liquid 44 includes as additives both at least one soluble fuel and at least one soluble oxidizer, with the at least one soluble fuel and the at least one soluble oxidizer reactable upon actuation to form additional gas. More specifically, when the liquid 44 is injected through the piston openings 94 and mixed with the gas produced by the combustion of the gas generant material, the at least one soluble fuel and the at least one soluble oxidizer desirably decompose, combust and/or otherwise react such as to form additional gaseous products.

Those skilled in the art and guided by the teachings herein provided will appreciate that various advantageous and/or benefits are attainable or can be realized through such addition of fuel and/or oxidizer in the liquid. For example, through the increased or added gas product production resulting via such addition, the gas generant load required for an inflator to produce a particular gas output can be reduced and thus one or more of the cost, size and weight of gas generant and the associated inflator can be reduced. Further, such addition of fuel and/or oxidizer in the liquid can be accomplished via a very simple process. Still further, the addition of the fuel and/or oxidizer can further serve to depress the freezing point of the liquid such as to reduce, minimize, or avoid the need to include a supplemental antifreeze material or additive in the liquid.

In another aspect there is provided a corresponding or associated method of cooling gas formed in an inflator. In one such embodiment, the inflator includes a housing at least in part defining a first chamber containing a quantity of gas generant, an initiator, and at least in part defining a second chamber adjacently disposed to the first chamber. The second chamber contains a sealed storage reservoir and a piston assembly. The sealed storage reservoir includes a liner including a cup-shaped base having a closed first end and an oppositely disposed open second end. The cup-shaped base includes a side wall covering an interior side wall surface of the second chamber and an end wall covering an end wall surface of the second chamber. The storage reservoir also includes a lid to connect to the base to seal close the second end of the base. The sealed storage reservoir contains a quantity of liquid. The piston assembly includes a piston.

In accordance with one such method of cooling gas formed in an inflator, the gas generant is ignited to form gas and result in the piston moving to unseal the storage reservoir to expel at least a portion of the quantity of liquid from the second chamber. The expelled liquid in turn contacts and cools gas formed by the ignition of the gas generant. The cooled gas can then be appropriately discharged or released from the inflator and used as may be desired such as to inflate an associated inflatable restraint device, for example.

Those skilled in the art and guided by the teachings herein provided will appreciate that the incorporation and use of sealed storage reservoirs, such as herein disclosed, for inflator device holding or containing of liquid materials for extended time periods such as required in association with vehicular safety restraint systems Through the incorporation and use of sealed storage reservoirs, such as herein disclosed, desirable liquid materials can be safely, effectively and efficiently incorporated in inflator devices such as are commonly required to have extended operational lifetimes.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator comprising:
    a housing at least in part defining a first chamber containing a quantity of gas generant;
    an initiator operatively associated with the first chamber and in reaction initiating communication with at least a portion of the quantity of gas generant, the initiator, upon actuation, to ignite at least a portion of the quantity of gas generant to form gas;
    the housing further at least in part defining a second chamber adjacently disposed to the first chamber, the second chamber containing a sealed storage reservoir and a piston assembly,
        the sealed storage reservoir comprising a liner including a cup-shaped base having a closed first end and an oppositely disposed open second end, the cup-shaped base including a side wall covering an interior side wall surface of the second chamber and an end wall covering an end wall surface of the second chamber, the storage reservoir also comprises a lid to seal close the second end of the base, the sealed storage reservoir containing a quantity of liquid,
        the piston assembly including a piston, wherein during deployment, the piston moves to unseal the storage reservoir to release at least a portion of the quantity of liquid such that the released liquid contacts and cools gas formed by the ignition of the gas generant; and
    the housing further having at least one discharge opening to permit gas to exit the housing.

2. The inflator of claim 1 wherein the lid is disposed adjacent to a front face of the piston.

3. The inflator of claim 1 wherein at least one of the base or the lid is formed of plastic.

4. The inflator of claim 3 wherein both the base and the lid are formed of plastic.

5. The inflator of claim 3 wherein the plastic is a low vapor transmission rate plastic.

6. The inflator of claim 5 wherein the low vapor transmission rate plastic is selected from the group consisting of polycarbonate, polycarbonate blends, PPS, PET, PBT, and PP.

7. The inflator of claim 1 wherein the piston is formed of metal.

8. The inflator of claim 7 wherein the piston includes a cylindrical side wall and an end wall, the end wall at least in part defining a front face of the piston, the piston also including a beaded ring extending around at least a portion of the cylindrical side wall adjacent to the end wall.

9. The inflator of claim 1 wherein the lid includes a circumferentially disposed attachment ring joined to the side wall of the liner, wherein during deployment, the piston moves to separate the attachment ring from the lid and to permit the piston to be slidingly received within the storage reservoir to hydraulically expel at least a portion of the quantity of liquid from the second chamber.

10. The inflator of claim 9 wherein the side wall of the liner additionally forms a shoulder having a pocket to restrain the attachment ring upon separation of the attachment ring from the lid during deployment.

11. The inflator of claim 1 wherein the cup-shaped base is adhesively bonded with the lid to seal close the second end of the base.

12. The inflator of claim 1 wherein the cup-shaped base is welded with the lid via laser transmission welding, ultrasonic welding, or solvent welding to seal close the second end of the base.

13. The inflator of claim 1 wherein the liquid comprises water.

14. The inflator of claim 9 wherein the liquid additionally comprises at least one of a fuel soluble in the liquid or an oxidizer soluble in the liquid.

15. An inflator comprising:
a housing at least in part defining a first chamber containing a quantity of gas generant solid, the first chamber having a constant volume;
an initiator operatively associated with the first chamber in reaction initiating communication with at least a portion of the quantity of gas generant solid, the initiator, upon actuation, to ignite the gas generant solid to form gas;
the housing additionally at least in part defining a second chamber adjacently disposed to the first chamber, the second chamber containing a sealed storage reservoir and a piston assembly,
the sealed storage reservoir comprising a liner including a cup-shaped base having a closed first end and an oppositely disposed open second end, the cup-shaped base including a side wall covering an interior side wall surface of the second chamber and an end wall covering an end wall surface of the second chamber, the storage reservoir also comprises a lid to seal close the second end of the base, the sealed storage reservoir containing a quantity of liquid, the liquid includes at least one of a fuel soluble in the liquid or an oxidizer soluble in the liquid;
the piston assembly including a piston, wherein during deployment, the piston moves to unseal the storage reservoir to release at least a portion of the quantity of liquid such that the released liquid contacts and cools gas formed by the ignition of the gas generant; and
the housing further having at least one discharge opening to permit gas to exit the housing.

16. The inflator of claim 15 wherein at least one of the base or the lid is formed of plastic.

17. The inflator of claim 16 wherein both the base and the lid are formed of plastic.

18. The inflator of claim 17 wherein the plastic is a low vapor transmission rate plastic.

19. The inflator of claim 15 wherein the liquid comprises water.

20. A method of cooling gas formed in an inflator, the inflator comprising a housing at least in part defining a first chamber containing a quantity of gas generant, an initiator, the housing further at least in part defining a second chamber adjacently disposed to the first chamber, the second chamber containing a sealed storage reservoir and a piston assembly, the sealed storage reservoir comprising a liner including a cup-shaped base having a closed first end and an oppositely disposed open second end, the cup-shaped base including a side wall covering an interior side wall surface of the second chamber and an end wall covering an end wall surface of the second chamber, the storage reservoir also comprises a lid to connect to the base to seal close the second end of the base, the sealed storage reservoir containing a quantity of liquid, the piston assembly including a piston, the method comprising:
igniting the gas generant to form gas; and
moving the piston to unseal the storage reservoir to expel at least a portion of the quantity of liquid from the second chamber such that the expelled liquid contacts and cools gas formed by the ignition of the gas generant.

* * * * *